(12) United States Patent
Larson et al.

(10) Patent No.: US 7,895,642 B1
(45) Date of Patent: Feb. 22, 2011

(54) TIERED SECURITY SERVICES

(75) Inventors: John Nathan Larson, Pacifica, CA (US); Mark Evans, San Mateo, CA (US); Travis Edward Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 920 days.

(21) Appl. No.: 11/751,722

(22) Filed: May 22, 2007

(51) Int. Cl.
*G06F 7/04* (2006.01)
(52) U.S. Cl. .................................. 726/3; 726/2; 718/1
(58) Field of Classification Search ............... 726/3, 726/2; 718/1
See application file for complete search history.

(56) References Cited

U.S. PATENT DOCUMENTS

| | | | |
|---|---|---|---|
| 7,373,655 B1 * | 5/2008 | Maria | 726/2 |
| 7,568,236 B2 * | 7/2009 | Gbadegesin et al. | 726/27 |
| 2007/0180493 A1 * | 8/2007 | Croft et al. | 726/2 |
| 2008/0005798 A1 * | 1/2008 | Ross | 726/26 |

* cited by examiner

*Primary Examiner*—Kambiz Zand
*Assistant Examiner*—Amare Tabor

(57) ABSTRACT

A system, a method and computer-readable media for supporting multiple security tiers in a network. A system is provided that includes an access terminal. The access terminal includes multiple virtual machines, which are each associated with a different security profile. The system further includes an access network that validates the virtual machines. The access network also assigns security procedures for use with the various virtual machines by referencing their associated security profiles. The system further includes a core network. The core network also enforces the various security profiles, and references the profiles in the selection of services used in the handling of communications from the virtual machines.

19 Claims, 4 Drawing Sheets

TIERED SECURITY SERVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Recent developments in wireless telecommunications have ushered in a new era of mobility. The advent of cellular and personal communications services has enabled people to maintain communication from virtually any location. Further, advanced technology has facilitated not only wireless voice communication but also wireless data communication, such as the ability to communicate over computer networks and to send and receive data and other content.

Wireless communications systems have existed for many years. In general, a wireless communications system uses mobile or fixed radios that communicate with a fixed radio tower that is in turn interconnected to a larger telecommunications network. Such systems can take a variety of forms. For example, traditional cellular communications systems provide radio coverage to a wide area, such as a city, through use of many radio towers. Typically, subscribers to wireless service are equipped with one or more wireless terminals or "client devices," which may take any of a variety of forms. By way of example, a wireless client device may be a telephone, a pager, a computer, a personal digital assistant ("PDA") or any combination of these or other devices. A wireless client device may be configured to receive and/or convey information such as voice and data (e.g., fax, e-mail and other text messages) and/or other media (e.g., audio, video and graphics). Further, the client device may include input and output facilities such as a touch-pad, a keyboard, a camera, a display, a microphone and/or a speaker. Some client devices are equipped with web browsing software to allow subscribers to communicate with web servers over an Internet Protocol (IP) network (i.e., the Internet).

Wireless networks and mobile wireless devices may use a number of channels to transmit and receive information, and a properly equipped wireless device can initiate communications by sending an initiation request message over one of these channels. Applying industry standards, the initiation request message may include a code that characterizes the requested communication as packet-data communication, as compared with traditional voice communication.

With the rapid growth in the area of wireless communications, a variety of different access technologies has emerged. For example, Code Division Multiple Access (CDMA) is a packet-based wireless-access technology that may be used in certain cellular phone systems. As another example, Wi-Fi is an access technology based on a series of specifications from the Institute of Electrical and Electronics Engineers (IEEE) called 802.11. Wi-Fi uses radio frequency and enables a wireless-enabled computer or PDA to connect to the Internet via a wireless access point. Yet another access technology being utilized today is commonly referred to as WiMax (Worldwide Interoperability for Microwave Access). WiMax, also known as the IEEE 802.16 group of standards, defines a packet-based wireless technology that provides high-throughput broadband connections over long distances.

Despite the recent advances in wireless networking, current networks and devices do not adequately support the ability to connect simultaneously to multiple different networks with differing levels of trust and/or security, strongly enforced separation and assured end-to-end security. Examples of networks with different levels of security include Internet (low security), enterprise networks (medium security), and government networks (high security). Without strongly enforced, end-to-end separation of networks with differing levels of trust and/or security, an Internet sourced Denial of Service (DoS) event today on a wireless access link may likely cause an outage for an enterprise network connection or a government network traversing the same wireless network infrastructure. Also, an endpoint compromise of a mobile device from an Internet interface today will typically compromise all data on the device. Given these negative results, there is clearly a need in the art for devices and networks that allow mobile devices to connect to multiple different networks with differing levels of trust and/or security, while assuring end-to-end security and separation of traffic.

SUMMARY

The present invention provides systems and methods for supporting multiple security tiers in a network. In one aspect of an embodiment of the present invention, a system is provided that includes an access terminal. The access terminal includes multiple virtual machines, which are each associated with a different security profile. The system further includes an access network that validates the virtual machines. The access network also assigns security procedures for use with the various virtual machines by referencing their associated security profiles. The system further includes a core network. The core network also enforces the various security profiles, and references the profiles in the selection of services used in the handling of communications from the virtual machines.

In another aspect of an embodiment of the present invention, a computer-implemented method is provided for supporting multiple security tiers in a network. Communications are received from an access terminal that includes multiple virtual machines. In one embodiment, the virtual machines are each associated with a different security profiles. For each of the virtual machines, authentication and encryption parameters are selected based on the security profiles associated with that machine. Communications originating from virtual machines associated with one of the security profiles are segregated from other traffic on the network.

In yet another aspect of an embodiment of the present invention, a method is provided for handling communications in accordance with multiple security profiles. Communications from an access terminal are received. The access terminal includes multiple virtual machines, and the communications include a first communication originating from a first virtual machine. The communications also include a second communication originating from a second virtual machine. The first communication and the first virtual machine are associated with a first security profile, and the second communication and the second virtual machine are associated with a second security profile. The method authenticates the first virtual machine by utilizing security parameters defined by the first security profile, while the second virtual machine is authenticated by utilizing security parameters defined by the second security profile. The security profiles are also used in the selection of network resources for carrying the first and the second communications.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
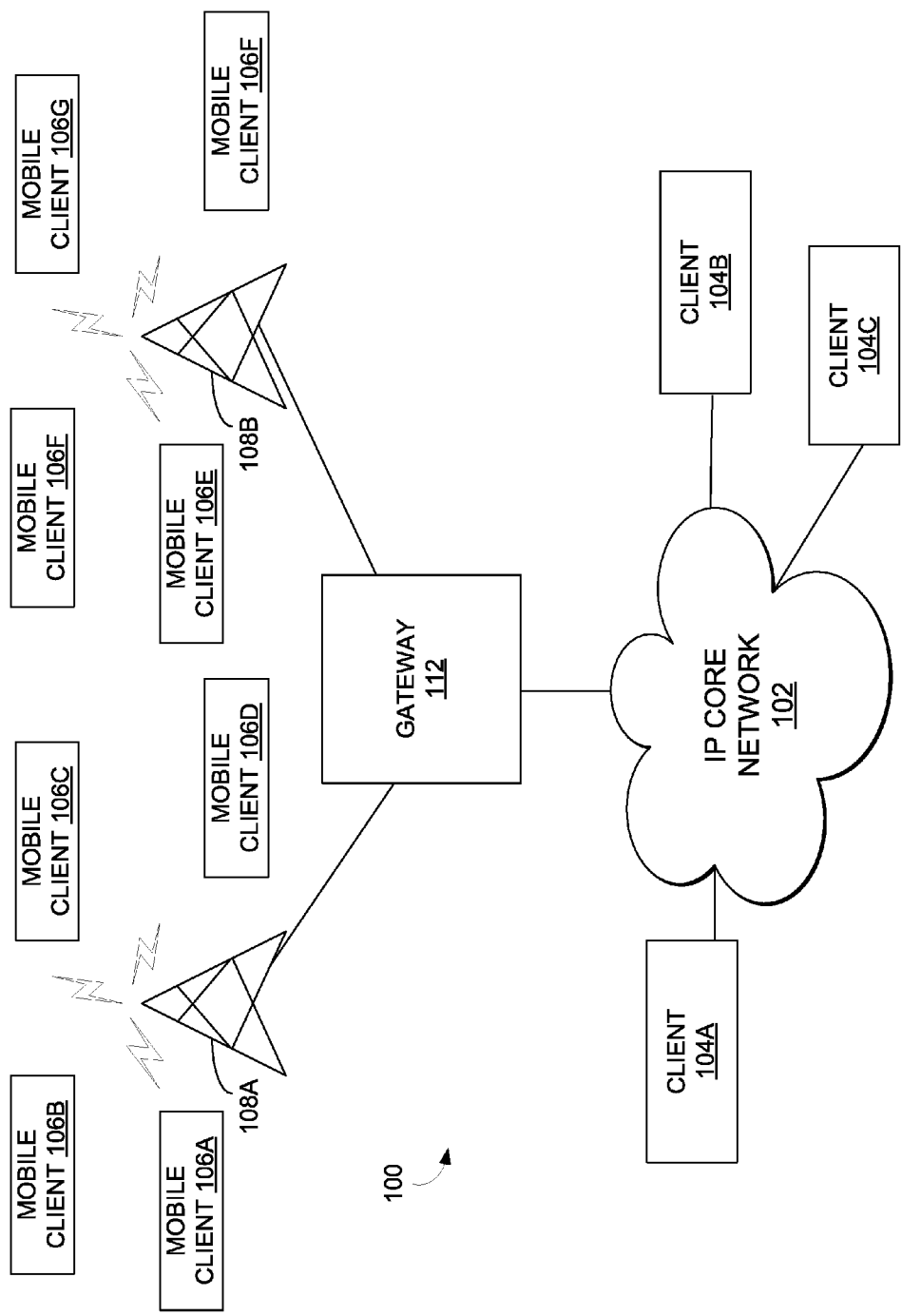
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for supporting multiple security tiers in a network. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline ("wired"). As will be appreciated by those skilled in the art, communication networks may take several of different forms and may use several different communication protocols.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only one exemplary network environment.

The network environment 100 includes an IP core network 102. The network 102 may be any network or combination of networks configured to provide communications between network devices. The network 102 provides communication services for clients 104A-104C. The clients 104A-104C may be any computing devices connected to the network 102, and each of the clients 104A-104C may have an address, such as an Internet protocol (IP) address, for uniquely identifying that client. The clients 104A-104C may interact with the network 102 to receive a variety of content such as voice, data or video.

The network environment 100 may also include a wireless communication system configured to provide communication services to mobile clients 106A-106F. In an exemplary wireless communication system, each mobile client 106A-106F may communicate via an air interface with a base transceiver station 108A or a base transceiver station 108B. The base transceiver stations 108A and 108B may be coupled to any number of different devices that enable connectivity with the network 102, the public Internet and/or a private intranet (e.g., a wireless carrier's core network). The base transceiver stations 108A and 108B may utilize any number of wireless access technologies or standards known in the art to communicate with the mobile clients 106A-106F.

In order to facilitate communication sessions originating from the mobile clients 106A-106F, the network environment 100 includes a gateway 112. As known to those skilled in the art, the gateway 112 may provide a variety of functions allowing clients to communicate with the IP core network 102. Such functions may vary based on the type of access technology being utilized by an originating client device. The gateway 112 may receive communication requests from the mobile clients 106A-106F, authenticate the clients and assign IP addresses.

Figure 2:
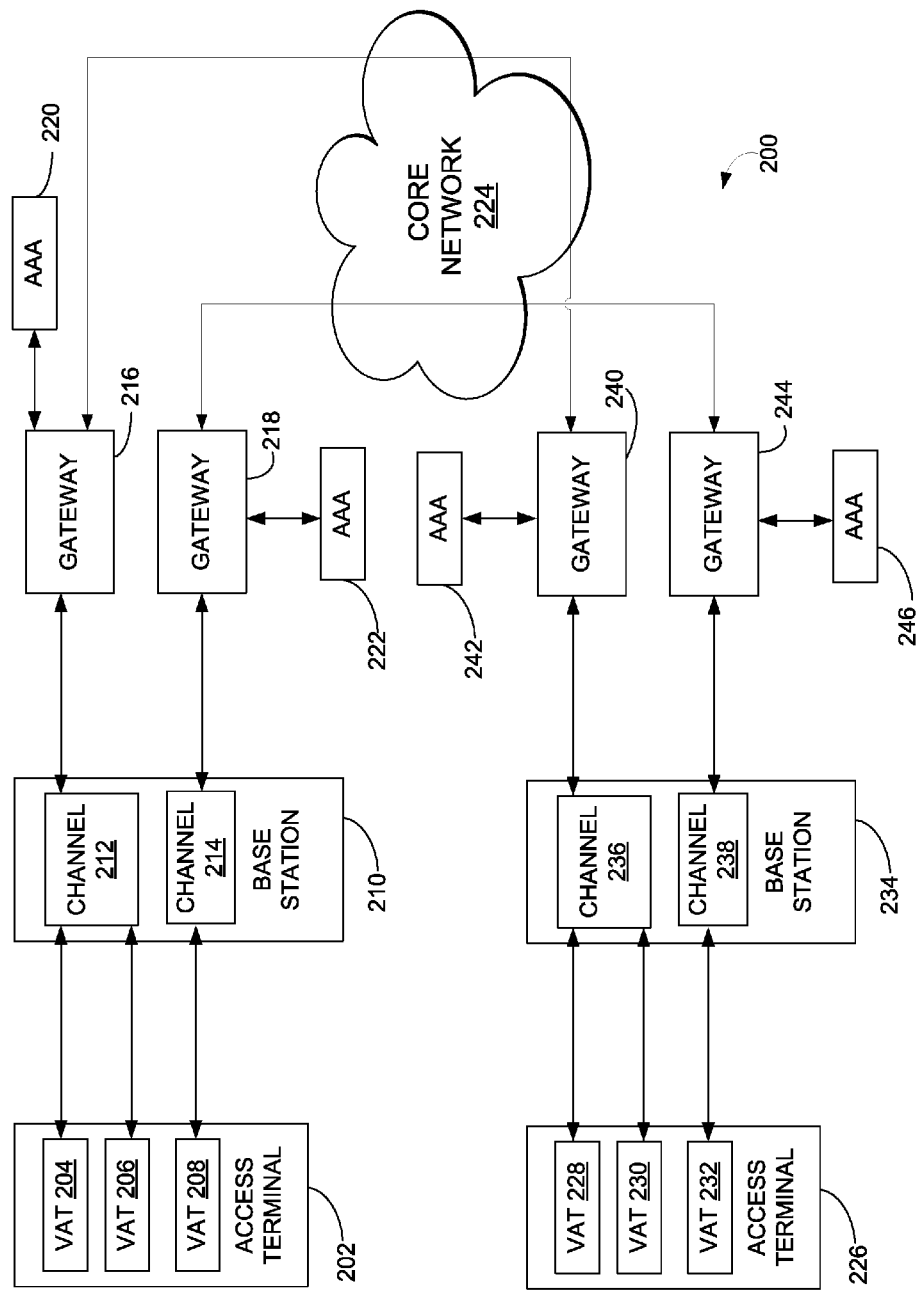
FIG. 2 is a schematic diagram representing a comprehensive security architecture in accordance with one embodiment of the present invention for supporting different tiers of security service.

FIG. 2 illustrates a network 200 that includes a comprehensive security architecture that supports different tiers of security service. The security tiers provide different levels of security (e.g., network availability, confidentiality and integrity), which are enforced end-to-end in the network 200. The different security tiers are provided via, for example, mechanisms such as device and user authentication and validation, the appropriate use of encryption, and physical and logical separation of networks. For mobile devices, this can includes separated Radio Access channels for improved availability at the highest tier security service, but the different security tiers may extend across both wireless and wireline access methods.

The network 200 includes an access terminal 202. In one embodiment, the access terminal 202 may be one of any number of devices capable of communicating wirelessly over an air interface. The device 202 may include applications that run on the access terminal 202. For example, the applications may include a browsing application, such as a Wireless Application Protocol (WAP) browser. When initiated, the browser may receive content from a host device via the Internet (or other IP network).

The access terminal 202 includes multiple end points, referred to herein as virtual access terminals (VATs) 204, 206 and 208. The each of the VATs 204, 206 and 208 has its own identity, and the VATs are each completely isolated from the other VATs on the access terminal 202 (using virtual partitions). Those skilled in the art will appreciate that a variety of techniques exist for isolating multiple end points on a single computing device.

Each of the VATs 204, 206 and 208 is assigned a unique personality/security profile and a unique identifier within a given trust zone. Trust zones indicate trusted groups at a specific security tier level, and each security profile defines a level of availability, confidentiality and integrity required for use with the devices in a given trust zone. For example, the profiles may define the encryption, device/application certification requirements and authentication methods to be used in connection with a particular trust zone. In one embodiment, the profiles further include Quality of Service (QoS) parameters and controls regarding which devices and users may join a particular trust zone.

The VATs 204, 206 and 208 may each be assigned profiles for different trust zones. For example, the VAT 208 may require the highest level of security and, in one embodiment, may be required to operate on a separate Radio Access Network channel from the lower tiers (including VATs 204 and 206). For instance, a base station 210 may provide a channel 212 and a channel 214. As illustrated by FIG. 2, the channel 212 may be used with the lower security tiers, while the channel 214 may be reserved for the highest level of security. In one embodiment, if a separate level RF Channel is not available for the highest level of security, the VAT 208 may operate on a shared channel (if allowed by the trust zone profile), but the VAT 208 will be given the highest level of priority on the RF Access network.

In one embodiment, use of separate VATs may not be required to access multiple networks. More specifically, separate VATs may not be required for some sets of networks (e.g. Internet/enterprise networks) but may be required for others (e.g. Internet/government networks). For example, the same VAT may be utilized when accessing both the Internet and an enterprise network. The security policy for this VAT may allow connections to both the Internet and the enterprise network, while the security policy for a second VAT on the access terminal may only allow connections to a specific government network.

In addition, it should be noted that the access terminal 202 may have the ability to simultaneously communicate with and connect to multiple access networks. For example, the VAT 204 may be connected to a first physical network (e.g. WiFi channel 6), while the VAT 206 simultaneously is connected to a second network (e.g EVDO Rev A Channel 175). Alternately, the access terminal 202 may have multiple VATs connected to the same access network. In this instance, the VAT 204 may be connected to a physical network (e.g. EVDO Rev A channel 125), while the VAT 206 is simultaneously connected to that same network via a separate communication channel.

The network 200 also includes a gateway 216 and a gateway 218. The gateway 216 may be configured to receive communications from the VATs 204 and 206 via the channel 212. In one embodiment, the gateway 216 may validate the VATs 204 and 206 and identify the security profiles associated with these VATs. Thereafter, the gateway 216 may assign network resources and security procedures for use with the VATs 204 and 206 based on their associated security profiles. In authenticating the VATs, the gateway 216 may utilize an AAA (Authentication Authorization Accounting) server 220.

The network 200 utilizes a separate gateway, the gateway 218, to receive communications from the VAT 208 via the channel 214. The gateway 218 utilizes an AAA server 222 for access control. Thus, the network 200 utilizes a dedicated authentication server and access gateway for the highest tier of service. In this manner, the VAT 208 may be strongly authenticated by the gateway 218. Moreover, the gateway 218 may enable use of encryption in the communications directed to and from the VAT 208. In one embodiment, such encryption may be utilized throughout the network 200, including in transmissions between the gateway 218 and the base station 210.

The network 200 also includes a core network 224. The core network 224 may also be configured to provide tiered services for the different levels of security. For example, the highest tier of security may be carried on a separate wavelength division multiplexing (DWDM) wavelength. The core network 224 may also provide confidentiality and integrity services based on VAT identity/associated profile. These services may include access to encryption and/or Multiprotocol Label Switching (MPLS). The core network 224 may optionally require the VAT 208 to perform additional authentication steps before allowing it access to secure services. Moreover, the core network 224 may include a higher security network that is logically and physically separated from the portion of the network supporting Internet traffic.

The network 200 includes a second access terminal, an access terminal 226. The access terminal 226 includes VATs 228, 230 and 232. The VAT 232 is associated with the highest security tier, while the VATs 228 and 230 are associated with lower security tiers. The network 200 also includes a base station 234, which provides a channel 236 for the lower security tiers and a channel 238 for the highest tier. The network 200 further includes a gateway 240 and an AAA server 242 for receiving communications from the VATs 228 and 230. A separate gateway 244 and an AAA server 246 are provided for use with communications from virtual devices associated with the highest security profile.

While the availability requirements may vary within a given trust zone, the confidentiality and integrity parameters will generally remain consistent for all devices in a trust zone. As such, it may be said that the security profiles are enforced end-to-end in the network 200. So, the VATs 208 and 232, which are both associated with the trust zone having the highest level of security, may exchange communications over the network 200 with the assurance that the base stations 210 and 234, the gateways 218 and 244 and the core network 224 will each maintain the security dictated by the highest security profile. Moreover, as will be appreciated by those skilled in the art, the network 200 enables devices (e.g., the terminals 202 and 226) to connect simultaneously to multiple different networks having differing levels of trust/security (availability, confidentiality, and integrity) with strongly enforced separation (logical and/or physical) and assured end-to-end security. As such, an endpoint compromise on the VAT 204 (e.g. an Internet interface) will not compromise data on the VAT 208, which is associated with a higher security tier.

It should be noted that in one embodiment of the present invention, as previously mentioned, an access terminal may access different networks at the same time. Moreover, in an alternative embodiment, an access terminal may be only permitted to connect to one network at a time. So, only one connection should be established despite the existence of multiple VATs. Nevertheless, as will be appreciated by those skilled in the art, nothing in the present disclosure should suggest approaches designed to violate the security requirements of a given network.

Figure 3:
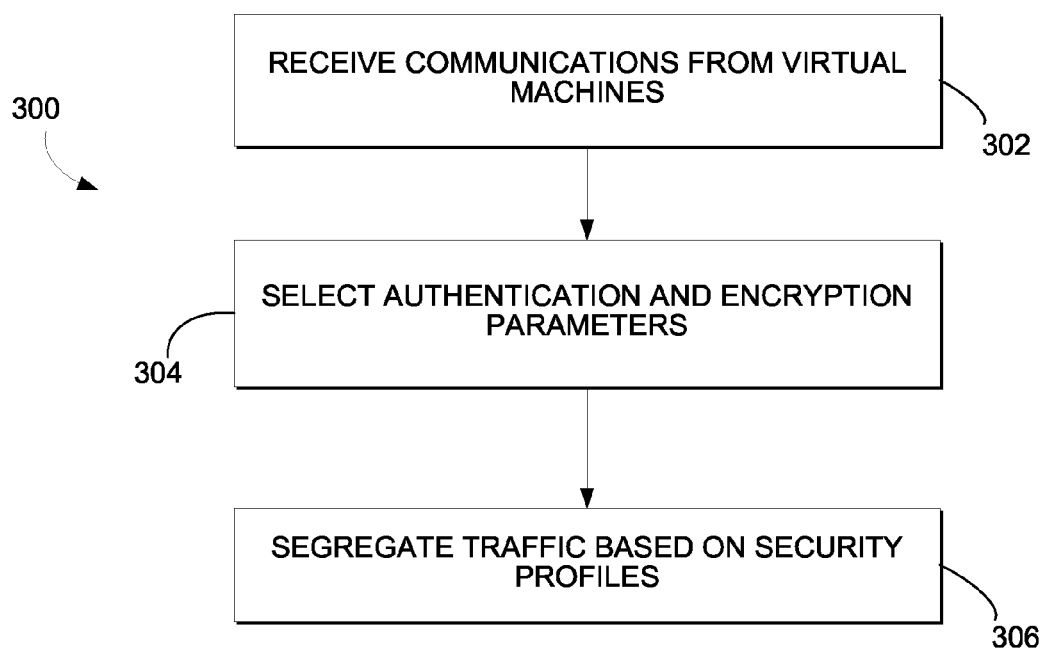
FIG. 3 illustrates a method in accordance with one embodiment of the present invention for supporting multiple security tiers in a network.

FIG. 3 illustrates a method 300 for supporting multiple security tiers in a network. The method 300, at a step 302, receives communications from virtual machines on a client device. For example, the communications may originate from one of any number of different client devices equipped to communicate wireless sly with a network. Moreover, the communications may be formatted in accordance with any number of different protocols, and a variety of access technologies may be used to broadcast the communications. In one embodiment, the client device includes multiple VATs, which are completely isolated from each other. Each of the VATs may be assigned a personality/security profile and an identifier within a given trust zone.

Once sent from the client device, the communications may be communicated amongst various element of the network before reaching an element configured to perform at least a portion of the method 300. In one embodiment, the request is forwarded to a gateway such as the gateways 216 and 218 of FIG. 2. Such gateways may be configured to provide a variety of functions to enable the support of multiple security tiers in the network.

At a step 304, authentication and encryption parameters are selected by the network for use with communications to and from a particular VAT. The selection of the authentication and encryption parameters may be based on the security profile associated with the VAT. Those skilled in the art will recognize that any number of security parameters/procedures may be varied with respect to the VATs of a client device. For example, a particular VAT may have a security profile requiring highly-secure authentication and verification procedures. This profile may be used with secure networks such as government networks. In contrast, a security profile associated with Internet access may require only minimally-secure authentication procedures and no encryption. Further, those skilled in the art will appreciate that the performance of the step 304 may be performed by multiple gateways (as illustrated by FIG. 2) or by a single gateway configured to enforce the multiple security profiles.

At a step 306, the network segregates certain communications from other traffic on the network. Such segregation may include carrying the communications on physically separate media and/or maintaining a logical separation in the network. In one embodiment, communications from VATs in the most-secure trust zone are segregated from traffic originating from VATs that reside in other zones. For example, such secure communications may be carried on a separate wireless channel (if available), handled by a separate gateway and/or be carried on a separate DWDM wavelength in the core network. In this manner, the security afforded by the most secure trust zone may be maintained and enforced end-to-end in the network.

Figure 4:
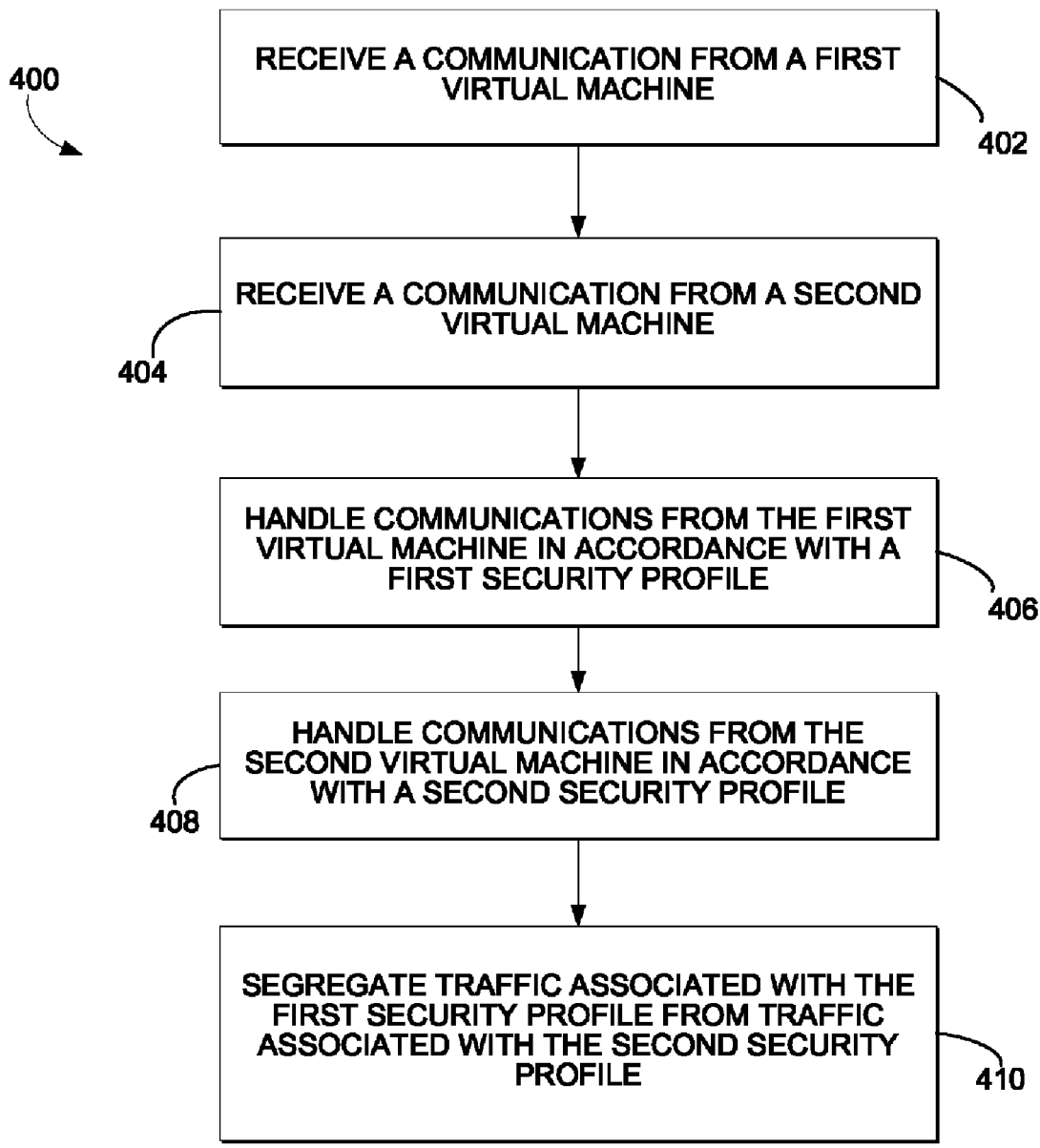
FIG. 4 illustrates a method in accordance with one embodiment of the present invention for handling communications in accordance with multiple security profiles.

FIG. 4 illustrates a method 400 for handling communications in accordance with multiple security profiles. The method 400, at a step 402, receives communications from a first virtual machine on a client device that includes multiple VATs. At a step 404, a second communication is received from a second virtual machine on the client device.

As previously discussed, the various end points in a network may each be associated with one of multiple security profile that define the security parameters/operations to be used with respect to the end points. For example, a gateway may recognize the security profile assigned to a device and then handle communications to and from that device in accordance with its profile. As such, the method 400, at a step 406, handles communications from the first virtual machine in accordance with a first security profile. Likewise, at a step 408, communications from the second virtual machine are handled in accordance with a second security profile. Such handling may include utilizing different encryption, different authentication and access parameters, and/or different transport media. At a step 410, the traffic originating from machines associated with the first security profile is segregated from traffic from machines associated with the second security profile so as to ensure end-to-end enforcement of the security profiles in the network.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A system for supporting multiple security tiers in a network, the system comprising:
   an access terminal that includes a plurality of virtual machines, wherein each of at least a portion of said plurality of virtual machines is associated with one of one or more security profiles;
   one or more access networks configured to validate said plurality of virtual machines and to assign one or more security procedures to at least a portion of said plurality of virtual machines based on the one or more security profiles associated with at least a portion of said plurality of virtual machines;
   a core network configured to provide one or more services to at least a portion of said plurality of virtual machines, wherein said core network is further configured to select said one or more services based on the one or more security profiles associated with at least a portion of said plurality of virtual machines; and one or more base stations configured to encrypt at least a portion of network communications transmitted between at least a portion of said plurality of virtual machines and at least a portion of said one or more access networks.

2. The system of claim 1, wherein said access terminal is configured to simultaneously access multiple of said one or more access networks.

3. The system of claim 1, wherein said access terminal includes virtual partitions for isolating at least one of said plurality of virtual machines.

4. The system of claim 1, wherein said one or more security profiles include availability access parameters.

5. The system of claim 1, wherein said one or more security procedures include one or more encryption parameters and include one or more authentication procedures.

6. The system of claim 1, wherein said core network is configured to provide end-to-end enforcement of said one or more security profiles.

7. The system of claim 1, wherein said core network is configured to provide confidentially services and integrity services based on said one or more security profiles associated with at least a portion of said plurality of virtual machines.

8. A computer-implemented method for supporting multiple security tiers in a network, the method comprising:

receiving one or more communications from one or more access terminals that include a plurality of virtual machines, wherein each of at least a portion of said plurality of virtual machines is associated with one of one or more security profiles;

encrypting at least a portion of said one or more communications from said one or more access terminals, wherein said encryption is performed by one or more base stations;

for each of at least a portion of said plurality of virtual machines, selecting one or more authentication parameters and one or more encryption parameters based on the one or more security profiles associated with at least a portion of said plurality of virtual machines; and segregating communications originating from virtual machines associated with one of said one or more security profiles from other traffic on said network.

9. The method of claim 8, wherein said segregating includes carrying said communications on physical media reserved for carrying said communications.

10. The method of claim 8, wherein each of said plurality of virtual machines is assigned a separate IP address.

11. The method of claim 8, further comprising validating the integrity of each of said plurality of virtual machines.

12. The method of claim 11, wherein said validating includes checking for tampering of one or more applications on at least a portion of said one or more access terminals.

13. The method of claim 8, further comprising providing end-to-end enforcement of said one or more security profiles while carrying said one or more communications over the network.

14. One or more computer storage media having computer-useable instructions embodied thereon to perform a method for handling communications in accordance with a plurality of security profiles, the method comprising:

receiving one or more communications from an access terminal that includes a plurality of virtual machines, wherein said one or more communications include a first communication originating from a first virtual machine and include a second communication originating from a second virtual machine, wherein said first communication and said first virtual machine are associated with a first security profile, and wherein said second communication and said second virtual machine are associated with a second security profile;

encrypting said first communication and said second communication, wherein said encryption is performed by one or more base stations;

authenticating said first virtual machine utilizing security parameters defined by said first security profile;

authenticating said second virtual machine utilizing security parameters defined by said second security profile;

utilizing said first security profile to select network resources for carrying said first communication; and utilizing said second security profile to select network resources for carrying said second communication.

15. The media of claim 14, wherein said method further comprises segregating said first communication from other traffic on said network by carrying said first communication on physical media associated with said first security profile.

16. The media of claim 14, wherein said access terminal is a mobile communications device.

17. The media of claim 14, wherein said method further comprises associating a first wireless communication channel with said first security profile and associating a second wireless communication channel with said security profile.

18. The media of claim 17, wherein said first wireless communication channel is reserved for communications from virtual machines associated with said first security profile.

19. The media of claim 18, wherein said method further comprises encrypting communications on said first wireless communication channel in accordance with said first security profile.

* * * * *